United States Patent
Salehi et al.

(10) Patent No.: US 12,507,983 B2
(45) Date of Patent: Dec. 30, 2025

(54) INTRODUCER SHEATH WITH IMAGING CAPABILITY

(71) Applicant: Boston Scientific Scimed, Inc., Maple Grove, MN (US)

(72) Inventors: Leili Salehi, Waltham, MA (US); Charles A. Gibson, Malden, MA (US); Zhihua He, Winchester, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 139 days.

(21) Appl. No.: 17/086,809

(22) Filed: Nov. 2, 2020

(65) Prior Publication Data

US 2021/0128106 A1   May 6, 2021

Related U.S. Application Data

(60) Provisional application No. 62/930,237, filed on Nov. 4, 2019.

(51) Int. Cl.
*A61B 8/00* (2006.01)
*A61B 8/12* (2006.01)
(Continued)

(52) U.S. Cl.
CPC ............... *A61B 8/12* (2013.01); *A61B 8/445* (2013.01); *A61B 8/4488* (2013.01);
(Continued)

(58) Field of Classification Search
CPC ............ A61B 8/4494; A61B 17/00234; A61B 18/1492; A61B 2090/3925;
(Continued)

(56) References Cited

U.S. PATENT DOCUMENTS

| 5,201,315 A | 4/1993 | Griffith |
| 5,651,366 A | 7/1997 | Liang et al. |

(Continued)

FOREIGN PATENT DOCUMENTS

| EP | 2036049 | 3/2009 |
| JP | 2016-514490 A | 5/2016 |

OTHER PUBLICATIONS

Toshio Kondo and Hiroyuki Fujimoto, Medical Transducer Arrays using Composite Materials for Acoustic Matching Layers, 2003, IEEE (Year: 2003).*

*Primary Examiner* — Pascal M Bui Pho
*Assistant Examiner* — Gabriel Victor Popescu
(74) *Attorney, Agent, or Firm* — Nelson Mullins Riley & Scarborough LLP

(57) ABSTRACT

A medical introducer sheath comprises a tubular shaft and an ultrasonic transducer array. The tubular shaft has a proximal end, a distal end opposite the proximal end, an inner surface, and an outer surface. The shaft defines a longitudinal axis extending between the proximal end and the distal end. The inner surface and the outer surface define a wall having a shaft wall thickness, the wall defining a distal wall face proximate the distal end of the shaft extending at an oblique angle relative to the longitudinal axis. The ultrasonic transducer array includes a plurality of ultrasound transducers disposed within the wall of the tubular shaft at the distal end thereof. The ultrasound transducers include an emitting/receiving surface generally aligned with the distal wall face, such that ultrasonic energy emitted from each of the ultrasound transducers is oriented directed generally at an oblique angle relative to the longitudinal axis.

18 Claims, 3 Drawing Sheets

(51) Int. Cl.
  *A61B 17/00* (2006.01)
  *A61B 18/14* (2006.01)
  *B06B 1/02* (2006.01)
  *B06B 1/06* (2006.01)
  *A61B 18/00* (2006.01)
  *A61B 90/00* (2016.01)

(52) U.S. Cl.
  CPC ...... *A61B 8/4494* (2013.01); *A61B 17/00234* (2013.01); *A61B 18/1492* (2013.01); *B06B 1/0292* (2013.01); *B06B 1/0625* (2013.01); *A61B 2017/00336* (2013.01); *A61B 2018/00351* (2013.01); *A61B 2018/00577* (2013.01); *A61B 2090/3925* (2016.02); *A61B 2090/3966* (2016.02); *B06B 2201/76* (2013.01)

(58) Field of Classification Search
  CPC ...... A61B 2090/378; A61B 2034/2063; A61B 2017/00336; B06B 1/0292; B06B 1/0625
  See application file for complete search history.

(56) References Cited

U.S. PATENT DOCUMENTS

| | | | | |
|---|---|---|---|---|
| 6,004,269 | A * | 12/1999 | Crowley | A61B 8/445 600/436 |
| 6,514,249 | B1 * | 2/2003 | Maguire | A61B 18/00 606/41 |
| 8,414,492 | B2 * | 4/2013 | Hadjicostis | A61B 8/4272 600/439 |
| 9,308,041 | B2 * | 4/2016 | Altmann | A61B 5/287 |
| 9,492,140 | B2 * | 11/2016 | Hossack | A61B 8/445 |
| 9,901,321 | B2 | 2/2018 | Harks et al. | |
| 10,420,605 | B2 * | 9/2019 | Rankin | A61B 5/0044 |
| 2005/0021015 | A1 * | 1/2005 | Keidar | A61B 17/2202 606/27 |
| 2007/0167804 | A1 * | 7/2007 | Park | A61B 8/445 600/459 |
| 2008/0183080 | A1 * | 7/2008 | Abraham | A61B 8/12 600/466 |
| 2009/0105588 | A1 | 4/2009 | Emelianov et al. | |
| 2009/0299360 | A1 * | 12/2009 | Ormsby | A61B 8/12 606/33 |
| 2012/0123270 | A1 * | 5/2012 | Klee | A61B 5/489 600/453 |
| 2014/0142432 | A1 * | 5/2014 | Hutchins | A61B 5/0035 400/462 |
| 2015/0257779 | A1 * | 9/2015 | Sinelnikov | A61B 8/12 600/439 |
| 2015/0305716 | A1 * | 10/2015 | Rice | A61B 8/4494 600/445 |
| 2016/0008636 | A1 | 1/2016 | Warnking | |
| 2018/0116630 | A1 * | 5/2018 | Dykes | A61B 8/12 |
| 2019/0000544 | A1 * | 1/2019 | Govari | A61B 8/4494 |
| 2019/0053785 | A1 * | 2/2019 | Stigall | A61B 8/12 |
| 2019/0069949 | A1 * | 3/2019 | Vrba | A61B 8/12 |
| 2019/0159800 | A1 * | 5/2019 | Thapliyal | A61N 7/022 |
| 2020/0352549 | A1 * | 11/2020 | Grim | A61B 8/4494 |
| 2021/0007759 | A1 * | 1/2021 | Jiang | A61N 7/00 |

* cited by examiner

INTRODUCER SHEATH WITH IMAGING CAPABILITY

CROSS-REFERENCE TO RELATED APPLICATION

This application claims priority to Provisional Application No. 62/930,237, filed Nov. 4, 2019, which is herein incorporated by reference in its entirety.

TECHNICAL FIELD

The present disclosure relates generally to devices and systems for imaging tissue within the body during a therapeutic procedure such as an ablation procedure. More specifically, the present disclosure relates to an introducer sheath with ultrasonic imaging capabilities.

BACKGROUND

Cardiac ablation therapies currently use fluoroscopic (i.e., X-ray) imaging to assist in locating and navigating the various access devices, diagnostic catheters and ablation catheters through the patient's vasculature to the target site within the patient's heart. For example, ablation therapies for terminating atrial fibrillation (AF) of the left atrium require crossing the atrial septum with an introducer sheath, and subsequently advancing the ablation and/or mapping catheters into the left atrium. A typical transseptal crossing is accomplished by first locating the desired access point (e.g., a location proximate the fossa ovalis), puncturing through the septum using a transseptal needle, advancing a dilator over the needle, and then advancing an introducer sheath over the needle and into the left atrium. With conventional instrumentation and techniques, the foregoing must all be accomplished under fluoroscopy, during which time the patient is exposed to the X-ray energy.

Various ultrasound-based imaging catheters and probes have been developed for directly visualizing body tissue in applications such as interventional cardiology, interventional radiology, and electrophysiology. For interventional cardiac electrophysiology procedures, for example, ultrasound imaging devices have been developed that permit the visualization of anatomical structures of the heart directly and in real-time. In some electrophysiology procedures, for example, ultrasound catheters may be used to image the intra-atrial septum, to guide transseptal crossing of the atrial septum, to locate and image the pulmonary veins, and to monitor the atrial chambers of the heart for signs of a perforation and pericardial effusion.

Many ultrasound-based imaging systems comprise an imaging probe that is separate from the access devices and the ablation catheters used to perform therapy on the patient. As a result, a position tracking system is sometimes used to track the location of each device within the body. In some procedures, it may be difficult for the physician to quickly and accurately determine the condition of tissue to be ablated. Moreover, the images obtained using many ultrasound-based imaging systems are often difficult to read and understand without reference to images obtained from a separate imaging system such as a fluoroscopic imaging system.

SUMMARY

In Example 1, a medical introducer sheath comprising a tubular shaft and an ultrasonic transducer array. The tubular shaft has a proximal end, a distal end opposite the proximal end, an inner surface, and an outer surface. The shaft defines a longitudinal axis extending between the proximal end and the distal end, the inner surface and the outer surface defining a wall of the tubular shaft having a shaft wall thickness, the wall defining a distal wall face proximate at the distal end of the shaft, the distal wall face extending oriented at an oblique angle relative to the longitudinal axis. The ultrasonic transducer array includes a plurality of ultrasound transducers disposed within the wall of the tubular shaft adjacent to the distal wall face at the distal end thereof, each of the ultrasound transducers including an emitting/receiving surface generally aligned with the distal wall face, oriented such that ultrasonic energy emitted from each of the ultrasound ultrasonic transducers is directed at an oblique angle relative to the longitudinal axis.

In Example 2, the medical introducer sheath of Example 1, wherein the distal wall face is oriented at an angle of 2 degrees to 25 degrees relative to a plane that is orthogonal to the longitudinal axis.

In Example 3, the medical introducer of Example 2, wherein the distal wall face is oriented at an angle of 5 degrees relative to a plane that is orthogonal to the longitudinal axis.

In Example 4, the medical introducer sheath of any of Examples 1-3, wherein the ultrasound ultrasonic transducers are arranged in a circular pattern about the longitudinal axis.

In Example 5, the medical introducer sheath of any of Examples 1-4, wherein the shaft includes an acoustic matching layer disposed over the distal wall face and the emitting/receiving surfaces of the ultrasound ultrasonic transducers.

In Example 6, the medical introducer sheath of any of Examples 1-5, further comprising a plurality of conductors extending along and disposed within the wall of the tubular shaft, each of the conductors electrically coupled to a respective one of the ultrasound transducers.

In Example 7, the medical introducer sheath of any of Examples 1-6, further comprising a steering wire disposed within the wall of the tubular shaft, and an anchor element secured to the wall of the tubular shaft and the steering wire to facilitate controlled deflection of the distal end of the tubular shaft.

In Example 8, the medical introducer sheath of any of Examples 1-7, wherein the inner surface of the tubular shaft defines an introducer lumen sized to slidably and rotatably receive a medical device shaft.

In Example 9, the medical introducer sheath of any of Examples 1-8, wherein each of the ultrasound transducers is a capacitative machined ultrasonic transducer (CMUT), or a piezoelectric micromachined ultrasonic transducer (PMUT).

In Example 10, the medical introducer sheath of any of Examples 1-9, wherein the ultrasound transducers are configured to operate at a driving frequency of between 5 MHz and 25 MHz.

In Example 11, the medical introducer sheath of any of Examples 1-10, wherein the ultrasound transducers are configured to operate at a driving frequency of between 10 MHz and 20 MHz.

In Example 12, the medical introducer sheath of any of Examples 1-1110, wherein each of the ultrasound transducers is individually addressable.

In Example 13, the medical introducer sheath of any of Examples 1-12, further comprising a band of echogenic material disposed about the tubular shaft at a location proximal to the distal end thereof.

In Example 14, the medical introducer sheath of any of Examples 1-13, further comprising a band of radiopaque material disposed about the tubular shaft proximate the band of echogenic material.

In Example 15, the medical introducer of any of Examples 1-14, wherein the plurality of ultrasound transducers are arranged in two concentric circular arrays about the longitudinal axis.

In Example 16, a medical introducer sheath comprising a tubular shaft and an ultrasonic transducer array. The shaft has a proximal end, a distal end opposite the proximal end, an inner surface, and an outer surface, the shaft defining a longitudinal axis extending between the proximal end and the distal end, the inner surface and the outer surface defining a wall of the tubular shaft having a shaft wall thickness, the inner surface of the tubular shaft defining an introducer lumen sized to slidably and rotatably receive an ablation catheter shaft, the wall of the tubular shaft defining a distal wall face at the distal end of the shaft, the distal wall face oriented at an oblique angle relative to the longitudinal axis. The ultrasonic transducer array includes a plurality of ultrasound transducers disposed within the wall of the tubular shaft at the distal wall face and oriented to emit ultrasonic energy at an oblique angle relative to the longitudinal axis.

In Example 17, the medical introducer sheath of Example 16, wherein the distal wall face is oriented at an angle of 2 degrees to 25 degrees relative to a plane that is orthogonal to the longitudinal axis.

In Example 18, the medical introducer of Example 17, wherein the distal wall face is oriented at an angle of 5 degrees relative to a plane that is orthogonal to the longitudinal axis.

In Example 19, the medical introducer sheath of Example 18, wherein the shaft includes an acoustic matching layer disposed over the distal wall face and the emitting/receiving surfaces of the ultrasound transducers.

In Example 20, the medical introducer sheath of Example 16, further comprising a plurality of conductors extending along and disposed within the wall of the tubular shaft, each of the conductors electrically coupled to a respective one of the ultrasound transducers.

In Example 21, the medical introducer sheath of Example 20, wherein each of the ultrasound transducers is a capacitive machined ultrasonic transducer (CMUT), or a piezoelectric micromachined ultrasonic transducer (PMUT).

In Example 22, the medical introducer sheath of Example 21, wherein the ultrasound transducers are configured to operate at a driving frequency of between 5 MHz and 25 MHz.

In Example 23, the medical introducer sheath of Example 22, wherein the ultrasound transducers are configured to operate at a driving frequency of between 10 MHz and 20 MHz.

In Example 24, the medical introducer sheath of Example 23, wherein each of the ultrasound transducers is individually addressable.

In Example 25, the medical introducer sheath of Example 24, further comprising a band of echogenic material disposed about the tubular shaft at a location proximal to the distal end thereof.

In Example 26, the medical introducer sheath of Example 25, further comprising a band of radiopaque material disposed about the tubular shaft proximate the band of echogenic material.

In Example 27, the medical introducer of Example 16, wherein the plurality of ultrasound transducers are arranged in two concentric circular arrays about the longitudinal axis.

In Example 28, a medical introducer sheath comprising a tubular shaft and a circular ultrasonic transducer array. The tubular shaft has a proximal end, a distal end opposite the proximal end, an inner surface, and an outer surface, the shaft defining a longitudinal axis extending between the proximal end and the distal end, the shaft further having an annular distal face surrounding an introducer sheath lumen sized to receive an ablation catheter shaft, the distal face oriented at an oblique angle relative to the longitudinal axis. The a circular ultrasonic transducer array is disposed within the shaft wall at the distal face and is configured to emit ultrasonic energy relative to the distal face at an oblique angle relative to the longitudinal axis.

In Example 29, the medical introducer sheath of Example 28, wherein the distal wall face is oriented at an angle of 2 degrees to 25 degrees relative to a plane that is orthogonal to the longitudinal axis.

In Example 30, the medical introducer of Example 29, wherein the distal wall face is oriented at an angle of 5 degrees relative to a plane that is orthogonal to the longitudinal axis.

In Example 31, the medical introducer sheath of Example 30, further comprising a band of echogenic material disposed about the tubular shaft at a location proximal to the distal end thereof.

In Example 32, the medical introducer sheath of Example 31, further comprising a band of radiopaque material disposed about the tubular shaft proximate the band of echogenic material.

In Example 33, a medical introducer sheath comprising a tubular shaft, an ultrasonic transducer array, a cap layer and a band of echogenic material. The tubular shaft has a proximal end, a distal end opposite the proximal end, an inner surface, and an outer surface, the shaft defining a longitudinal axis extending between the proximal end and the distal end, the inner surface and the outer surface defining a wall of the tubular shaft having a shaft wall thickness, the wall defining a distal wall face at the distal end of the shaft, the distal wall face oriented at an oblique angle relative to the longitudinal axis, the shaft further. The ultrasonic transducer array includes a plurality of ultrasound transducers disposed within the wall of the tubular shaft at the distal end thereof, each of the ultrasound transducers including an emitting/receiving surface generally aligned with the distal wall face, such that ultrasonic energy emitted from each of the ultrasound transducers is directed at an oblique angle relative to the longitudinal axis. The cap layer is disposed over the distal face of the tubular shaft and the emitting/receiving surfaces of the ultrasound transducers, the cap layer being transparent to ultrasound energy emitted from the ultrasound transducers. The band of echogenic material is disposed about the tubular shaft at a location proximal to the distal end thereof.

In Example 34, the medical introducer sheath of Example 33, wherein the distal wall face is oriented at an angle of 2 degrees to 25 degrees relative to a plane that is orthogonal to the longitudinal axis.

In Example 35, the medical introducer of Example 34, wherein the distal wall face is oriented at an angle of 5 degrees relative to a plane that is orthogonal to the longitudinal axis.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
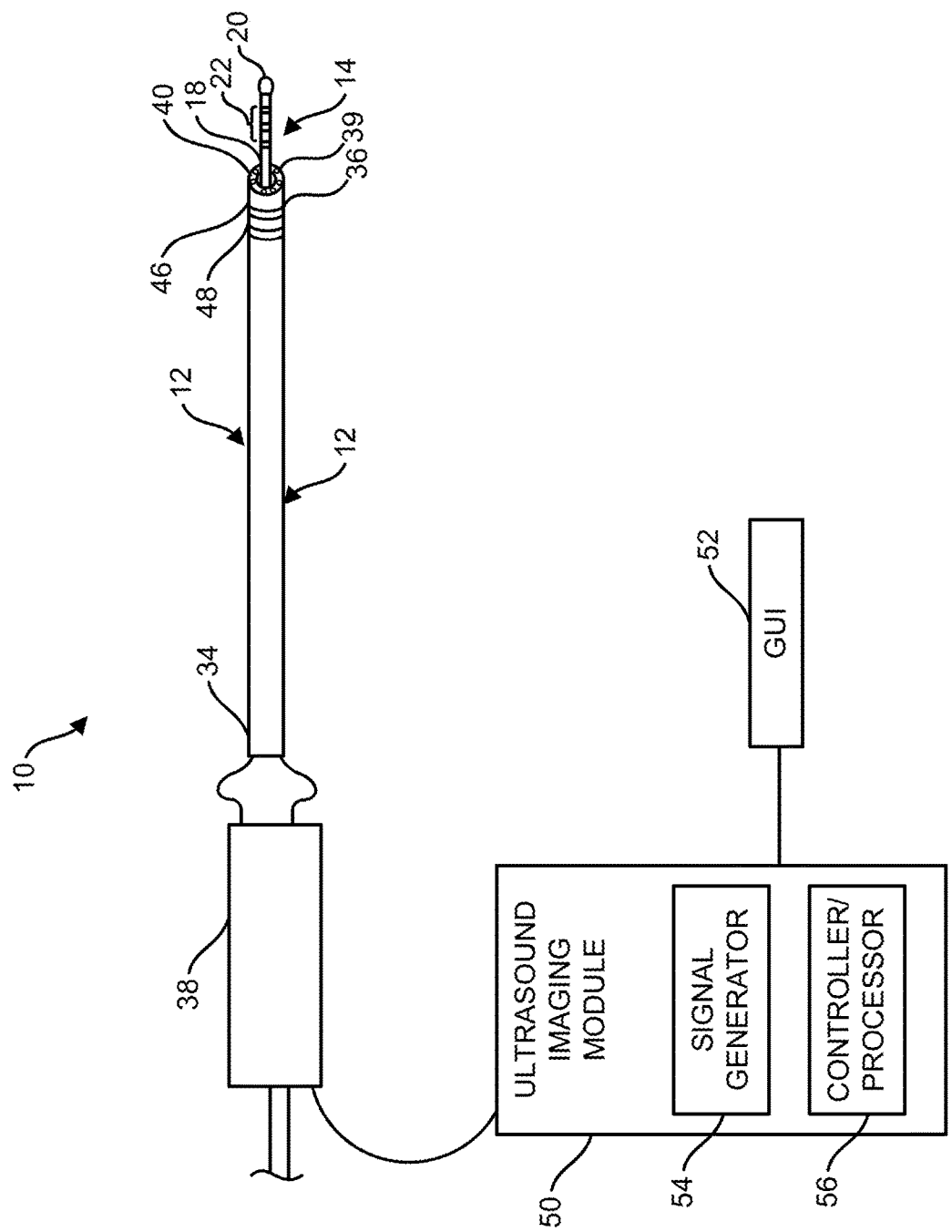
FIG. 1 shows an illustration of a medical system including an ablation catheter and a medical introducer sheath with ultrasonic imaging capabilities, in accordance with various aspects of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a schematic illustration of a medical system 10 according to one embodiment of the present disclosure. As shown in FIG. 1, the medical system 10 includes an introducer sheath 12 and an ablation catheter 14 disposed therein. In the various embodiments, the medical introducer sheath 12 is configured to assist the clinician in deploying the ablation catheter 14 to a target location within the body of a patient for performing a therapeutic ablation procedure. In one particular embodiment, the ablation catheter 14 is of the type configured for ablating cardiac tissue to terminate cardiac arrhythmias such as atrial fibrillation. In addition, as will be explained in greater detail elsewhere, the medical introducer sheath 12 includes ultrasonic imaging capabilities to aid the clinician in accessing the anatomical site of interest, imaging anatomical features, and monitoring progress and effectiveness of the ablation procedure. In some cases, the unique functionality of the medical introducer sheath 12 may greatly reduce, and potentially eliminate altogether, the clinician's reliance on fluoroscopy as a means for visualizing the medical introducer sheath 12 and/or ablation catheter 14 during the procedure.

It is emphasized, however, that while the foregoing discussion and description below is directed primarily to the use of the medical introducer sheath 12 in conjunction with a cardiac ablation procedure, in other embodiments, the medical introducer sheath 12 may be used in a broad range of medical procedures requiring the introduction of a payload into the body. In short, the present disclosure is not limited to any particular clinical use.

The ablation catheter 14, in the illustrated embodiment, is of a design typical of radiofrequency (RF) ablation catheters, and includes a catheter body 18, a tip electrode 20 and one or more ring electrodes 22 located on the catheter body 18 proximal to the tip electrode 20. The tip electrode 20 is configured to deliver RF energy generated by an external source (not shown) to the target cardiac tissue to thermally ablate the tissue and therefore form lesions so that the targeted tissue is incapable of conducting undesired physiological signals. In various embodiments, the ring electrodes 22 are operable as sensing electrodes that can be used to generate intracardiac electrograms before, during and after the application of the RF energy. It is emphasized, however, that the other types of ablation catheters using energy sources in addition to or in lieu of the RF energy can be used in conjunction with the novel medical introducer sheath 12. Examples of other types of ablation devices can include, but are not limited to, microwave ablators, acoustic ablators, cryoablation ablators, and laser/optical ablators, to name a few.

As shown, the medical introducer sheath 12 includes a shaft 32 having a proximal end 34 and an opposite distal end 36, and a handle mechanism 38 attached to the proximal end 34. As further shown, the shaft 32 is tubular and defines a shaft lumen 39 sized to slidably and rotatably receive the ablation catheter 14 (or other elongate medical device) therein. In embodiments, the size of the medical introducer sheath 12 can be tailored to the particular clinical application in which it is used. For example, the size and configuration of the shaft 32 and the shaft lumen 39 can be tailored based on the particular medical device 14 being deployed therethrough. Similarly, the overall length of the medical introducer sheath 12 can be tailored to the particular anatomical area of interest in which it is used.

In various embodiments, the handle mechanism 38 is configured to be manipulated by the operator to control the advancement and configuration of the shaft 32 during use. In embodiments, the medical introducer sheath 12 may be of the deflectable or steerable type, such that the distal region can be deflected (either in a uni-directional or bi-directional fashion) in response to manipulation of the handle mechanism 38. In such embodiments, the medical introducer sheath 12 also includes steering elements (not shown in FIG. 1) to facilitate such deflection. It is emphasized, however, that the deflectability and steerability of the medical introducer sheath 12, and the means for accomplishing this functionality, is not of particular importance to the present disclosure. As such, the present disclosure contemplates medical introducer sheath 12 designs that may not be deflectable or steerable.

As further shown, the medical introducer sheath 12 includes various imaging components, in particular, an ultrasonic transducer array 40 at the distal end 36 of the shaft 32, an echogenic marker 46 and a radiopaque marker 48. In the illustrated embodiment, the echogenic marker 46 and the radiopaque marker 48 are depicted as bands of echogenic and radiopaque material, respectively, carried by the shaft 32 at a location proximal to the distal end 36. The echogenic marker 46 facilitates localization and tracking of the distal region of the medical introducer sheath 12 using conventional ultrasound imaging technologies. Similarly, the radiopaque marker 48 facilitates localization and tracking of the distal region of the medical introducer sheath 12 using conventional fluoroscopy. While the echogenic marker 46 is particularly useful in facilitating use of the medical introducer sheath 12 in various medical procedures using minimal or no fluoroscopy, the particular design of the echogenic marker 46 (e.g., the particular materials used, the dimensions or specific location on the shaft 32) are not of critical importance to the present disclosure.

In embodiments, as will be explained in greater detail below, the ultrasound transducer array 40 is operable to provide for real-time ultrasonic imaging of the patient anatomy during the medical procedure. In this regard, the medical system 10 also includes an ultrasonic imaging module 50 and a graphical user interface (GUI) 52. In embodiments, the ultrasonic imaging module 50 is configured for generating high resolution ultrasonic images (e.g., A, M, or B-mode images) of anatomical structures within the body based on signals received from the ultrasonic transducer array 40, which images can be displayed on the GUI 52.

In the embodiment of FIG. 1, the ultrasonic imaging module 50 includes an ultrasonic signal generator 54 and an image processor 56. The ultrasonic signal generator 54 is configured to provide electrical signals for controlling the ultrasonic transducer array 40. The imaging signals received back from the ultrasonic transducer array 40, in turn, are fed to the image processor 56, which processes the signals and generates images that can be displayed on the GUI 52. In certain embodiments, for example, the ultrasonic images displayed on the GUI 52 can be used to assist the physician with advancing the medical introducer sheath 12 and the ablation catheter 14 through the body and to perform an ablation procedure. In cardiac ablation procedures, for example, the ultrasonic images generated from the ultrasound signals can be used to confirm tissue contact of the ablation catheter 14 within the heart or surrounding anatomy, to determine the orientation of the medical introducer sheath 12 and the ablation catheter 14 within the body, to determine the tissue depth of the tissue at a target ablation site, to visualize the progression of a lesion being formed in the tissue, and to monitor adjacent anatomical structures (e.g., the esophagus) to avoid undesired collateral effects on such structures.

Various characteristics associated with the ultrasonic transducer array 40 as well as the circuitry within the ultrasonic imaging module 50 can be controlled to permit the ultrasonic transducer array 40 to accurately detect tissue boundaries (e.g., blood or other bodily fluids), lesion formation and progression, as well as other characteristics of the tissue before, during, and/or after the ablation procedure. Example tissue characteristics that can be visualized include, but are not limited to, the presence of fluid vaporization inside the tissue, the existence of a prior scar, the size and shape of a lesion being formed, as well as structures adjacent to heart tissue (e.g., lungs, esophagus). The depth at which the ultrasonic transducer array 40 can facilitate visualization of the anatomical structures within the body is dependent on the mechanical characteristics of the ultrasonic transducer array 40, the electrical characteristics of the sensor circuitry including the drive frequency of the signal generator 54, the boundary conditions and degree of attenuation between the ultrasonic transducer array 40 and the surrounding anatomy, as well as other factors.

As will be explained in greater detail below, unlike traditional rotational intravascular ultrasound (IVUS) catheters, which transmit generally perpendicular to the axis of the catheter through a wall of the surrounding catheter, the medical introducer sheath 12 is able to transmit and receive ultrasonic signals in a generally forward facing direction. This configuration can be particularly useful in guiding the medical introducer sheath 12 and/or the ablation catheter 14 through the patient anatomy. In addition, the generally forward-facing direction of the ultrasonic transducer array 40 results in the field-of-view of the resulting images being more closely aligned with the location of the active elements of the ablation catheter 14, and correspondingly, the target tissue to which the ablative energy is applied.

Figure 2A:
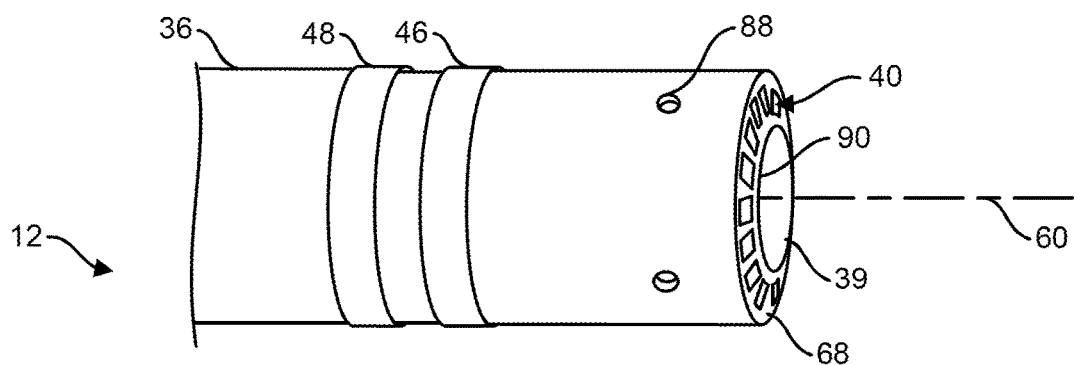
FIGS. 2A-2B are perspective images of the distal end portion of the medical introducer sheath of FIG. 1.
Figure 2B:
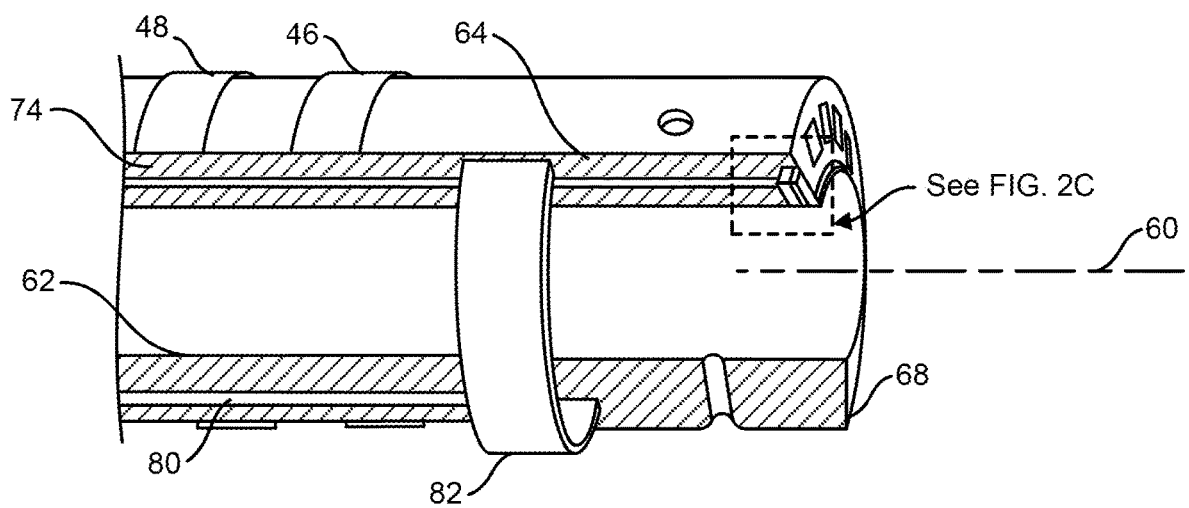
Figure 2C:
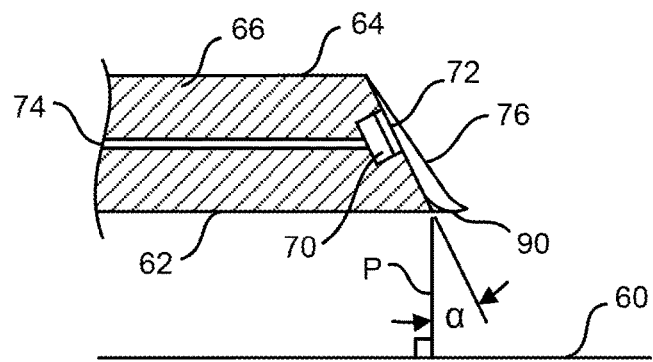
FIG. 2C is a partial cross-sectional view of a portion of the medical introducer sheath of FIG. 1.

FIG. 2A is a perspective image of the distal end region of the medical introducer sheath 12, FIG. 2B, is a partial cutaway of the view of FIG. 2A, and FIG. 2C is an enlarged cross-sectional view of a portion of the shaft 32, according to various embodiments. As shown, the shaft 32 defines a longitudinal axis 60, and has an inner surface 62 and an opposite outer surface 64 that together define a shaft wall 65 therebetween having a wall thickness. As further shown, the inner surface 62 defines the shaft lumen 39. Additionally, the distal extremity of the shaft wall 66 defines a distal wall face 68.

As can be seen in FIGS. 2A-2B, the ultrasonic transducer array 40 is composed of a plurality of individual ultrasound transducers 70 disposed within the shaft wall 66 at the distal end 36 of the shaft 30. As further shown, each of the ultrasound transducers 70 has an emitting/receiving face 72 oriented in a generally forward direction, as will be described in greater detail elsewhere. In the illustrated embodiment, the ultrasonic transducer array 40 is a circular array, with each of the ultrasound transducers 70 arranged in a circular pattern and equally spaced from one another about the longitudinal axis 60. However, in other embodiments, the ultrasound transducers 70 may be non-uniformly spaced. Overall, the particular configuration of the ultrasonic transducer array 40, e.g., the number, location, orientation and operating characteristics of the ultrasound transducers 70, can be tailored to the particular clinical application.

Furthermore, while the illustrated embodiment includes a single "ring" of ultrasound transducers 70, in other embodiments, the ultrasonic transducer array 40 may include two or more rings of ultrasound transducers 70.

As further shown in FIGS. 2A-2B, the medical introducer sheath 14 further includes a plurality of electrical conductors 74 extending along and disposed within the tubular shaft 32. Each of the electrical conductors 74 is electrically connected to a respective one of the ultrasound transducers 70 as well as to the ultrasonic imaging module 50.

In the illustrative embodiment of FIGS. 2A-2C, the medical introducer sheath 12 also includes a cap layer 76 disposed over the distal wall face 68 and the ultrasound transducers 70. In embodiments, in addition to hermetically encapsulating the distal wall face 68 and the ultrasonic transducer array 40, the cap layer 76 is configured to serve various functions, as will be explained in greater detail elsewhere.

The medical introducer sheath 12 also includes, in the illustrated embodiment, an echogenic marker 78 positioned about the shaft 32 proximal to the distal end 36. In embodiments, the echogenic marker 78 is configured to facilitate localization and tracking of the medical introducer sheath 12 using ultrasound imaging. The echogenic marker 78 can be formed using any suitable construction selected to enhance visibility under ultrasound, such that the echogenic marker 78 can be distinguished under ultrasound from other features on the medical introducer sheath 12. In some embodiments, the echogenic marker 78 can be formed by the addition of physical features (e.g., grooves, microbubbles, etc.) in the shaft 32. In various embodiments, the echogenic marker 78 can be integrally formed in the shaft 32. In other embodiments, the echogenic marker 78 can be formed separately from the shaft 32 and attached to the shaft 32 during manufacture thereof. The inclusion of the echogenic marker 78 can advantageously allow for greatly reduced reliance on X-ray visualization compared to conventional procedures of the same type (e.g., cardiac ablation procedures), particularly when used in conjunction of the intracardiac ultrasound imaging capability of the medical introducer sheath 12 itself.

The medical introducer sheath 12 also includes, in the illustrated embodiment, a radiopaque marker 79 positioned about the shaft 32 proximal to the distal end 36. As will be readily understood, the radiopaque marker 79 is configured to allow for fluoroscopic visualization of the distal end 36 of the medical introducer sheath 12 when necessary.

In the illustrated embodiment, the medical introducer sheath 12 further includes additional features to enhance its functionality and utility. For example, the particular medical introducer sheath 12 is of the deflectable type (as discussed above) and includes steering elements to allow the user to selectively change the shape of the distal region. For example, the medical introducer sheath 12 includes a steering wire 80 attached to an anchor band 82 securely fixed to the shaft 32 proximate the distal end 36. As will be appreciated, the steering wire 80 is attached to an actuating mechanism in the handle 38 that can be manipulated by the user to deflect the distal region of the shaft 32. In the particular embodiment illustrated, only a single steering wire 80 is shown in FIG. 2B, terminating at the anchor band 82. It is emphasized, however, that the particular means of providing deflectability are not critical to the present disclosure, and the skilled artisan will recognize that other deflection arrangements can be utilized in the medical introducer sheath 12 without departing from the scope of the present disclosure. As such, in various embodiments, the medical introducer sheath 12 may be uni-directionally or bi-directionally deflectable, or may be capable of forming complex, multi-dimensional shapes depending on the particular clinical application in which it is used.

Still additionally, the shaft 32 includes a plurality of irrigation ports 88 extending through the shaft wall 66 into the shaft lumen 39 to facilitate perfusion and irrigation of the anatomical site during use. The shaft 32 also has, at its distal extremity, a resilient band of material having which is operable as a hemostasis valve 90. In use, the hemostasis valve 90 encircles and contacts the ablation catheter 14 shaft to inhibit fluid (e.g., blood) ingress from the anatomical site proximally up the shaft lumen 39. In other embodiments, the irrigation ports 88 and hemostasis valve 90 may be omitted.

As can be seen in FIGS. 2A-2C, the distal end 36 of the shaft 32 is tapered such that the distal wall face 68 extends at an oblique angle α relative to a plane P that is orthogonal to the longitudinal axis 60. Additionally, the ultrasound transducers 70 are disposed within the shaft wall 66 such that the emitting/receiving face 72 of each ultrasound transducer 70 is aligned with the distal wall face 68. As such, ultrasonic waves are emitted from the ultrasound transducers 70 in a direction that oblique with respect to the longitudinal axis 60. This slight deviation from a strictly forward-facing transducer orientation can advantageously minimize adverse effects that highly reflective surfaces on the ablation catheter 14 (e.g., the tip electrode 20 and/or the ring electrodes 22) may have on the resulting ultrasound image, while still providing a substantially forward-directed field-of-view of the ultrasound image.

Additionally, the cap layer 76 is disposed over the distal wall face 68 and the emitting/receiving face 72 of each of the ultrasound transducers 70. As shown, the cap layer 76 has a thickness such that a resulting distal tip 92 of the shaft 32 has a tapered, frusto-conical profile. This frusto-conical profile can advantageously aid the user when advancing the distal tip 92 through the patient's atrial septum from the right atrium to the left atrium during an ablation procedure in the latter.

For example, in various embodiments, the medical introducer sheath 12 may be a component of an introducer sheath system for crossing the patient's inter-atrial septum from the right atrium to facilitate procedures in the left atrium. In such embodiments, the introducer system may include the medical introducer sheath 12 in combination with one or more tapered dilators advanced through the medical introducer sheath 12 and designed to progressively enlarge an opening formed in the septum, typically by passing a needle through a dilator lumen and across the septum. In embodiments, the tapered, frusto-conical profile of the tip of the medical introducer sheath 12 can complement the taper of each dilator to assist in the transseptal puncture procedure. In various embodiments, multiple medical introducer sheaths 12 can be paired with different dilators, with the respective medical introducer sheaths 12 having different tip taper angles to provide the clinician with a range of options for optimizing the transseptal puncture procedure.

In embodiments, the shaft 32 can be designed and constructed such that the distal wall face 68 is tapered at an angle α of between 1 degree and 25 degrees relative to the plane P. In one exemplary, non-limiting embodiment, the foregoing taper angle α is 5 degrees. The foregoing ranges provide optimal field-of-view properties.

In alternative embodiments, the distal wall face 68 may be formed so as to be substantially orthogonal to the longitudinal axis 60 (i.e., is not tapered). In such embodiments, the frusto-conical shape of the distal tip 92 can be accomplished entirely by the shape of the cap layer 76.

In the various embodiments, the ultrasound transducers 70 can be selected to provide the operational characteristics required for the particular therapeutic and diagnostic needs. In various embodiments, the operating parameters for the ultrasound transducers can be selected to achieve the desired imaging needs, e.g., focal depts of 1-8 centimeters with resolution sufficient to effectively image the anatomical structures of interest. In embodiments, the ultrasound transducers 70 may be configured to operate at driving frequencies of between 5 MHz and 25 MHz. In various embodiments, the ultrasound transducers 70 may be configured to operate at driving frequencies of between 10 MHz and 20 MHz.

In various embodiments, the ultrasound transducers 70 are each individually addressable, and the ultrasound imaging module 50 (see FIG. 1) can be configured to drive the ultrasound transducers 70 so as to optimize the imaging capabilities for the particular clinical situation. For example, selected ultrasound transducers 70 can be configured as transmitting and receiving pairs or sets. The ultrasound imaging module 50 can control the driving sequence, the driving frequency, and/or the timing of the ultrasound signals to control the image characteristics. In embodiments, the ultrasound imaging module 50 can be configured to employ known beam steering/shaping methodologies.

The illustrated embodiment includes an ultrasonic transducer array 40 composed of ultrasound transducers 70 arranged in a circular array about the longitudinal axis 60. In other embodiments, other arrangements can be employed. For example, in embodiments, the ultrasound transducers 70 may be arranged in two or more concentric rings around the longitudinal axis 60. In embodiments, the ultrasound transducer 70 may be equally spaced from one another, while in other embodiments the ultrasound transducers may have different spacing. For example, in embodiments pairs or sets of ultrasound transducers 70 may be defined and positioned in close proximity to one another, with the spacing between adjacent pairs/sets being greater than the spacing between individual ultrasound transducers 70 in each pair/set. As still additional examples when two or more concentric rings of the ultrasound transducers 70 are provided, each ring or layer of ultrasound transducers 70 may have different characteristics, e.g., different center frequencies, different spacing or different numbers of transducers 70. In addition, in such embodiments, the orientations of the ultrasound transducers 70 in the respective layers can be different. For example, in one embodiment utilizing an inner and an outer ring of ultrasound transducers 70, the inner ring may include transducers 70 oriented at an angle α of 5 degrees, while the outer ring may include transducers 70 oriented at an angle α of 10 degrees. Still additional configurations of the ultrasound transducers 70 will be readily apparent to the skilled artisan based on the foregoing.

The number of ultrasound transducers 70 in the ultrasonic transducer array 50 may be selected to accomplish the desired imaging functionality for a given clinical use. In general, the number of ultrasound transducers 70 employed may depend on various factors, including without limitation, the transducer size/diameter, the shaft wall thickness, and the desired imaging characteristics. In embodiments, the ultrasonic transducer array 50 may include 32 ultrasound transducers 70.

In the various embodiments, any ultrasound transducer technology types having the desired operating and form factor requirements can be used. In embodiments, the ultrasound transducers 70 can be capacitative micromachined ultrasound transducers (CMUTs) or piezoelectric micromachined ultrasound transducers (PMUTs). CMUTs can be particularly advantageous for the ultrasonic transducer array 40, in that they can be customized for the required operating characteristics in a form factor of only a few micrometers in diameter. In other embodiments, the ultrasound transducers 70 may be of the lead zirconate ticonate (PZT) transducer types.

The cap layer 76 can serve additional functions. In embodiments, the cap layer 76 can serve as an acoustic matching layer. In such embodiments, the cap layer 76 can be configured to acoustic properties, e.g., acoustic impedance, selectively designed to enhance ultrasound energy transfer between the ultrasound transducers 72 and the medium (e.g., blood or cardiac tissue) through which ultrasound signals generated by the ultrasound transducers 72 are transmitted and reflected. The cap layer 76 can also be configured to operate as an acoustic lens for further facilitating the transmission of the ultrasound signals from/to the ultrasound transducers 70. In addition, the cap layer 76 provides a hermetic encapsulation over the ultrasound transducers 70.

In the illustrated embodiment, the ultrasound transducers 70 and the electrical conductors 74 are shown embedded within the shaft wall 66. In such embodiments, the ultrasound transducers 70 and the electrical conductors 74 and the electrical conductors 74 may be integrally embedded in the shaft wall 66 during the manufacture of the shaft 32 using conventional manufacturing techniques. In other embodiments, the tubular shaft 32 may be formed of an extruded tube having individual conductor lumens formed therein, and the ultrasound transducers 70 and the electrical conductors 74 and the electrical conductors 74 can be strung through the conductor lumens during the assembly of the medical introducer sheath 12. In other embodiments, the electrical conductors 74 may be disposed within the shaft lumen 39. In short, the particular means for incorporating the ultrasound transducers 70 and the electrical conductors 74 within the medical introducer sheath 12 are not critical to the present disclosure.

In the illustrated embodiment, the electrical conductors 74 are depicted as conductor wires for illustration purposes. However, it will be appreciated that the particular depiction is in no way intended to limit the scope of the present disclosure to any specific conductor type. By way of example, in embodiments, the electrical connection of the ultrasound transducers 70 to the ultrasound imaging module 50 can be accomplished via flexible circuits such as are known in the art. Still other electrical connection means will be readily apparent to the skilled artisan based on the foregoing.

Figure 3A:
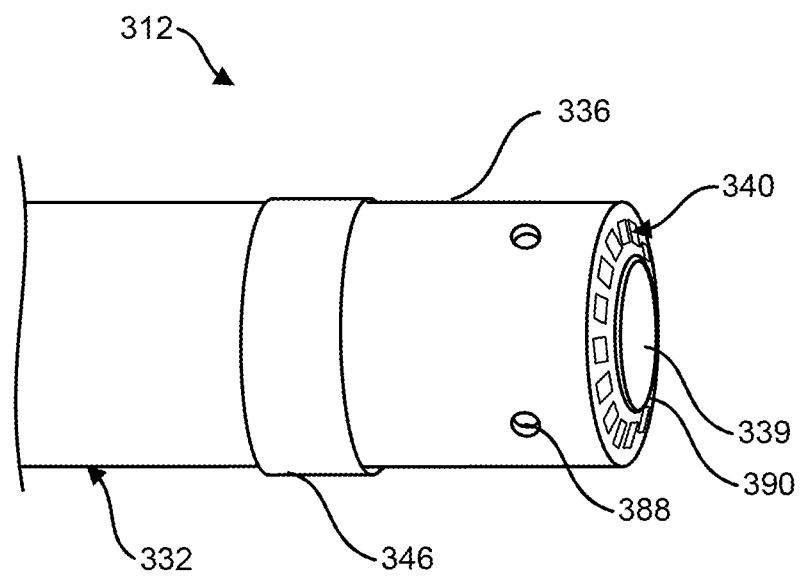
FIGS. 3A and 3B are perspective images of the distal end portion of an alternative medical introducer sheath, according to various aspects of the present disclosure.
Figure 3B:
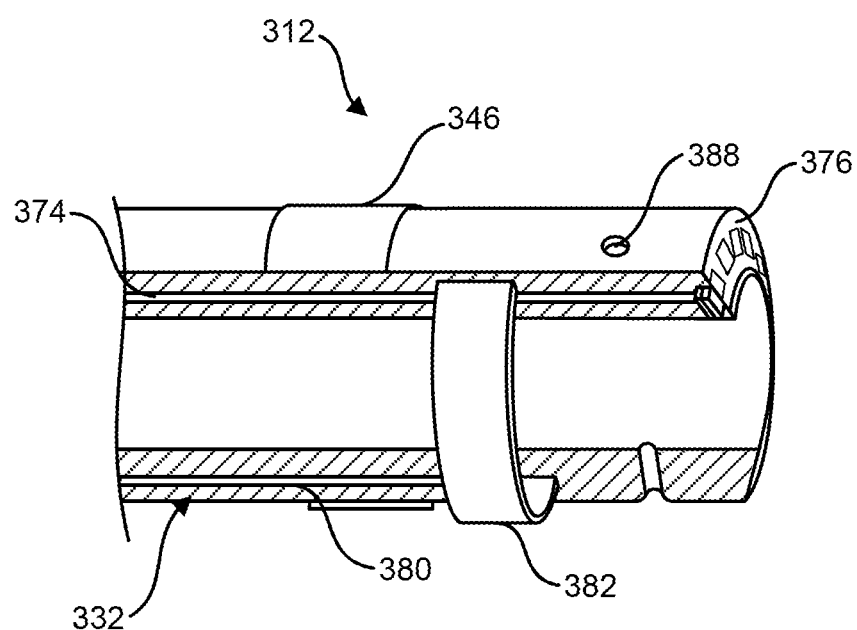

FIG. 3A is a perspective image of the distal end region of an alternative medical introducer sheath 312, and FIG. 3B is a partial cutaway of the view of FIG. 3A, according to various embodiments. The medical introducer sheath 312 is substantially the same in design and construction as the medical introducer sheath 12 and variations thereof described previously, and incudes a tubular shaft 332 having a distal end 336, a shaft lumen 339 sized to slidably and rotatably receive the ablation catheter 14 (or other elongate medical device), and an ultrasonic transducer array 340 disposed at the distal end 336, and a cap layer 376 disposed over the ultrasonic transducer array 340 in the same manner as the corresponding elements of the medical introducer sheath 12. Similarly, like the medical introducer sheath 12, the medical introducer sheath 312 includes a plurality of electrical conductors 374, steering elements including a steering wire 380 and anchor band 382, a plurality of irrigation ports 388 and a hemostasis valve 390 at the distal tip of the shaft 332.

The medical introducer sheath 312 differs from the medical introducer sheath 12 in that the medical introducer sheath 312 includes a single imaging marker 346 proximal to the distal end 336. In embodiments, the imaging marker 346 can be an echogenic marker constructed in a manner similar to the echogenic marker 46. In embodiments, the imaging marker 346 may be a radiopaque marker similar to the radiopaque marker 48. In other embodiments, the imaging marker 346 may have both echogenic and radiopaque properties such that it can be visualized both using ultrasound imaging and fluoroscopic imaging technologies.

Various embodiments of the medical introducer sheaths 12, 312 can further include additional features to enhance their functionality. For example, in embodiments, a 5- or 6-degree-of-freedom magnetic tracking sensor (not shown) can be provided at a fixed, known location on the shaft to facilitate tracking of the medical introducer sheath within the patient anatomy using magnetic tracking techniques (e.g., such as those provided by the RHYTHMIA™ electroanatomical mapping system marketed by Boston Scientific Corporation). When so equipped, the medical introducer sheath 12, 312 and the ultrasound imaging module 50 can operate as intra-cardiac imaging system for 3D visualization of the heart chamber and vessels, and the generated ultrasound images can be integrated with, or used by the clinician in conjunction with, the anatomical and/or electro-anatomical maps generated by the aforementioned mapping system, or with other imaging modalities (e.g., CT, MRI, or 3D ultrasound) that may be used prior to the use of the medical introducer sheath 12, 312.

Still additionally, the medical introducer sheaths 12, 312 may be equipped with one or more external shaft electrodes (e.g., ring electrodes near the distal tip) to facilitate impedance tracking of the medical introducer sheath 12, 312 as is also known in the art. Impedance tracking capability can be provided in addition to, or in lieu of, the magnetic tracking capability described above.

The medical introducer sheaths 12, 312 can provide the clinician with a wide range of capabilities. For example, the generally forward-facing ultrasonic transducer arrays 40, 340 can provide real-time ultrasound imaging of the anatomical structures in the direction of advancement of the sheaths through the anatomy. In particular, the combination of the generally forward-facing ultrasound imaging and the external ultrasound imaging facilitated by the echogenic markers 46, 346 can provide for accurate navigation of the medical introducer sheaths 12, 312 within the patient anatomy with minimized reliance on fluoroscopy relative to conventional techniques. In addition, the imaging capabilities can be particularly effective in assisting the clinician in locating specific anatomical features of interest, e.g., the fossa ovalis for locating the transseptal puncture site for left atrial procedures, and the pulmonary vein ostia for pulmonary vein isolation procedures.

The medical introducer sheaths 12, 312 can also provide for real-time visualization and monitoring of the treatment site(s) and nearby anatomical structures during the application of ablation therapy. For example, the ultrasonic transducer arrays 40, 340 can generate real-time ultrasound images of the tissue being ablated for purposes of assessing lesion effectiveness and transmurality, as the necrosed cardiac tissue will exhibit a different ultrasound response than the adjacent healthy tissue. Similarly, during the application of the ablation energy, it is often desirable to assess the proximity of other anatomical structures, particularly the esophagus when the ablation is being performed in the left atrium, so as to avoid unintended collateral damage to such structures. The ultrasonic imaging functionality of the medical introducer sheaths 12, 312 are uniquely adapted to provide simultaneous imaging of the ablation site and nearby organs while the ablation energy is being applied, and without requiring insertion of a separate instrument in addition to those used for deployment of the ablation catheter 14. This can greatly simplify the procedure, with savings in both procedure time and complexity.

The imaging functionality of the medical introducer sheaths 12, 312 and associated equipment can also be used as an alternative to direct tissue temperature monitoring. In various embodiments, the ultrasound imaging module 50 can be configured to process ultrasonic transducer array 40 output to generate an image of tissue elasticity of the imaged tissue, e.g., using techniques such as shear-wave tissue elastography. The elasticity images can also be correlated to tissue temperature, and a real-time temperature map can be displayed on the GUI 52 during the application of ablation energy. The systems of the present disclosure thus can facilitate tissue temperature monitoring without the need for additional instrumentation, e.g., a separate temperature probe in the patient's esophagus.

An added advantage of the medical introducer sheaths 12, 312 is that the foregoing imaging and diagnostic capabilities are provided in the same device that can be used to deploy the ablation catheter 14 (FIG. 1) or other therapeutic or diagnostic device.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A medical introducer sheath comprising:
    a tubular shaft having a proximal end, a distal end opposite the proximal end, an inner surface, and an outer surface, the tubular shaft defining a longitudinal axis extending between the proximal end and the distal end, the inner surface and the outer surface defining a wall of the tubular shaft having a shaft wall thickness, the inner surface of the tubular shaft defining an introducer lumen sized to slidably and rotatably receive an ablation catheter shaft, the wall of the tubular shaft defining a distal wall face at the distal end of the tubular shaft, the distal wall face defining the distal most portion of the medical introducer sheath and being oriented at an oblique angle relative to the longitudinal axis;
    an acoustic matching layer disposed over a portion of the distal wall face; and
    an ultrasonic transducer array including a plurality of ultrasound transducers disposed in a plane within the wall of the tubular shaft at the distal wall face, the ultrasound transducers arranged in two concentric circular arrays about the longitudinal axis and equally spaced from one another about the longitudinal axis, each ultrasonic transducer including a single emitting/receiving face, and the ultrasonic transducer array oriented to emit ultrasonic energy distally at an oblique angle relative to the longitudinal axis;
    wherein the ultrasonic transducer array is configured for imaging of a patient's anatomy distal to the distal wall face.

2. The medical introducer sheath of claim 1, wherein the distal wall face is oriented at an angle of 2 degrees to 25 degrees relative to a plane that is orthogonal to the longitudinal axis.

3. The medical introducer of claim 2, wherein the distal wall face is oriented at an angle of 5 degrees relative to a plane that is orthogonal to the longitudinal axis.

4. The medical introducer sheath of claim 1, further including an acoustic matching layer disposed over the emitting/receiving surfaces of the ultrasound transducers.

5. The medical introducer sheath of claim 1, further comprising a plurality of conductors extending along and disposed within the wall of the tubular shaft, each of the conductors electrically coupled to a respective one of the ultrasound transducers.

6. The medical introducer sheath of claim 5, wherein each of the ultrasound transducers is a capacitative machined ultrasonic transducer (CMUT), or a piezoelectric micromachined ultrasonic transducer (PMUT).

7. The medical introducer sheath of claim 6, wherein the ultrasound transducers are configured to operate at a driving frequency of between 5 MHz and 25 MHz.

8. The medical introducer sheath of claim 7, wherein the ultrasound transducers are configured to operate at a driving frequency of between 10 MHz and 20 MHz.

9. The medical introducer sheath of claim 8, wherein each of the ultrasound transducers is individually addressable.

10. The medical introducer sheath of claim 9, further comprising a band of echogenic material disposed about the tubular shaft at a location proximal to the distal end thereof.

11. The medical introducer sheath of claim 10, further comprising a band of radiopaque material disposed about the tubular shaft proximate the band of echogenic material.

12. A medical introducer sheath comprising:
    a tubular shaft having a proximal end, a distal end opposite the proximal end, an inner surface, and an outer surface, the tubular shaft defining a longitudinal axis extending between the proximal end and the distal end, the inner surface and the outer surface defining a wall of the tubular shaft having a shaft wall thickness, the inner surface of the tubular shaft defining an introducer lumen sized to slidably and rotatably receive an ablation catheter shaft, the wall of the tubular shaft defining a distal wall face at the distal end of the tubular shaft and defining the distal-most portion of the medical introducer sheath, the distal wall face oriented at an angle of 2 degrees to 25 degrees relative to a plane that is orthogonal to the longitudinal axis; and an ultrasonic transducer array configured for imaging a patient's anatomy distal to the distal wall face, the ultrasonic transducer array including a plurality of ultrasound transducers disposed in a plane within the wall of the tubular shaft at the distal wall face in a circular pattern around the introducer lumen and equally spaced from one another about the longitudinal axis, each ultrasonic transducer having a single emitting/receiving face configured to emit ultrasonic energy, and the emitting/receiving faces of the ultrasonic transducer array oriented to emit ultrasonic energy distally at an oblique angle relative to the longitudinal axis.

13. The medical introducer of claim 12, wherein the distal wall face is oriented at an angle of 5 degrees relative to a plane that is orthogonal to the longitudinal axis.

14. The medical introducer sheath of claim 12, wherein the tubular shaft includes an acoustic matching layer disposed over the distal wall face and the emitting/receiving surfaces of the ultrasound transducers.

15. The medical introducer sheath of claim 12, further comprising a plurality of conductors extending along and disposed within the wall of the tubular shaft, each of the conductors electrically coupled to a respective one of the ultrasound transducers.

16. The medical introducer sheath of claim 15, wherein each of the ultrasound transducers is a capacitative machined ultrasonic transducer (CMUT), or a piezoelectric micromachined ultrasonic transducer (PMUT).

17. The medical introducer sheath of claim 16, wherein the ultrasound transducers are configured to operate at a driving frequency of between 5 MHz and 25 MHz.

18. The medical introducer of claim 12, wherein the ultrasound transducers are arranged in two concentric circular arrays about the longitudinal axis.

* * * * *